United States Patent
Wang

(10) Patent No.: US 11,120,757 B2
(45) Date of Patent: *Sep. 14, 2021

(54) GRAY SCALE ADJUSTMENT METHOD AND DEVICE FOR DISPLAY PANEL

(71) Applicants: HKC CORPORATION LIMITED, Shenzhen (CN); CHONGQING HKC OPTOELECTRONICS TECHNOLOGY CO., LTD., Chongqing (CN)

(72) Inventor: Mingliang Wang, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/320,484

(22) PCT Filed: Jun. 26, 2018

(86) PCT No.: PCT/CN2018/092942
§ 371 (c)(1),
(2) Date: Jan. 25, 2019

(87) PCT Pub. No.: WO2019/001435
PCT Pub. Date: Jan. 3, 2019

(65) Prior Publication Data
US 2021/0021791 A1   Jan. 21, 2021

(30) Foreign Application Priority Data
Jun. 26, 2017 (CN) .......................... 201710497582.2

(51) Int. Cl.
*G09G 3/36* (2006.01)
*H04N 9/04* (2006.01)
(Continued)

(52) U.S. Cl.
CPC .......... *G09G 3/3648* (2013.01); *G09G 3/006* (2013.01); *G09G 3/2803* (2013.01); *G09G 3/36* (2013.01);
(Continued)

(58) Field of Classification Search
CPC .............. H04N 9/045; H04N 9/04513; G09G 2320/0233; G09G 2320/0673; G09G 2360/16
See application file for complete search history.

(56) References Cited

U.S. PATENT DOCUMENTS 8,797,346 B2 *   8/2014   Park ........................ G06T 5/001
                                                           345/590
8,913,092 B2 *  12/2014   Ha ........................ G09G 3/3208
                                                           345/690
(Continued)

FOREIGN PATENT DOCUMENTS

CN       104464637 A     3/2015
CN       105047164 A    11/2015
(Continued)

*Primary Examiner* — Brian P Yenke
(74) *Attorney, Agent, or Firm* — Kilpatrick Townsend & Stockton LLP

(57) ABSTRACT

The present invention discloses a gray scale adjustment method and device for a display panel. The method includes: performing an image acquisition on the display panel to obtain a current image; identifying a relationship between a sum of gray scale values of all pixels in the current image and a target value by a distinguishing method, in order to identify an uneven block in the current image; detecting an original output luminance and an original input gray scale of the uneven block; determining a target input gray scale (Continued)

corresponding to a preset target luminance according to an actual gamma curve value obtained by testing the display panel; and taking a difference between the original input gray scale and the target input gray scale as a gray scale compensation value of the uneven block.

19 Claims, 6 Drawing Sheets

(51) Int. Cl.
    *G09G 3/28*     (2013.01)
    *H04N 1/407*     (2006.01)
    *G09G 5/10*     (2006.01)
    *G09G 3/00*     (2006.01)

(52) U.S. Cl.
    CPC ......... *G09G 3/3607* (2013.01); *G09G 3/3611* (2013.01); *G09G 5/10* (2013.01); *H04N 1/4078* (2013.01); *H04N 9/04513* (2018.08); *G09G 2310/027* (2013.01); *G09G 2320/029* (2013.01); *G09G 2320/0233* (2013.01); *G09G 2320/0626* (2013.01); *G09G 2320/0673* (2013.01); *G09G 2330/12* (2013.01); *G09G 2360/16* (2013.01)

(56) References Cited

U.S. PATENT DOCUMENTS

| | | | | |
|---|---|---|---|---|
| 9,460,651 | B2* | 10/2016 | Chun | G09G 3/3208 |
| 9,805,667 | B2* | 10/2017 | Deng | G09G 3/006 |
| 9,966,042 | B2* | 5/2018 | Deng | G09G 3/006 |
| 10,032,406 | B2* | 7/2018 | Deng | G09G 3/3208 |
| 10,083,654 | B2* | 9/2018 | Deng | H01L 27/3241 |
| 10,121,408 | B2* | 11/2018 | Deng | G09G 3/2074 |
| 10,388,254 | B2* | 8/2019 | Lee | G09G 5/06 |
| 10,403,218 | B2* | 9/2019 | Zhao | G02F 1/13306 |
| 10,460,701 | B2* | 10/2019 | Luo | G09G 3/20 |
| 10,582,176 | B2* | 3/2020 | Qiu | H04N 5/243 |
| 10,699,662 | B2* | 6/2020 | Liu | G09G 3/3648 |
| 10,801,948 | B2* | 10/2020 | Chien | G01N 21/21 |
| 2007/0216777 | A1* | 9/2007 | Quan | G06K 9/4642 348/222.1 |
| 2008/0284774 | A1* | 11/2008 | Yamashita | G09G 3/32 345/212 |
| 2015/0187289 | A1* | 7/2015 | Kim | G09G 3/3644 345/89 |
| 2015/0187303 | A1* | 7/2015 | Choi | G09G 3/20 345/691 |
| 2015/0356932 | A1 | 12/2015 | Kim et al. | |
| 2018/0102088 | A1* | 4/2018 | Deng | G09G 3/3208 |
| 2018/0102091 | A1* | 4/2018 | Deng | G09G 3/3233 |
| 2018/0144719 | A1* | 5/2018 | Lee | G09G 3/006 |
| 2018/0166030 | A1* | 6/2018 | Liu | G09G 3/20 |
| 2018/0233096 | A1* | 8/2018 | Zhao | G02F 1/13306 |
| 2019/0066574 | A1* | 2/2019 | Wang | G09G 3/3208 |
| 2019/0066627 | A1* | 2/2019 | Wang | G09G 5/10 |
| 2019/0066628 | A1* | 2/2019 | Wang | G09G 5/10 |
| 2019/0266966 | A1* | 8/2019 | Wang | G09G 3/3648 |
| 2019/0266968 | A1* | 8/2019 | Wang | G09G 3/36 |
| 2019/0385544 | A1* | 12/2019 | Tan | G09G 5/10 |
| 2020/0126497 | A1* | 4/2020 | Wang | H04N 9/04513 |
| 2020/0160801 | A1* | 5/2020 | Wang | G09G 3/006 |
| 2020/0184912 | A1* | 6/2020 | Wang | G09G 3/006 |
| 2020/0211442 | A1* | 7/2020 | Kim | G09G 3/2007 |

FOREIGN PATENT DOCUMENTS

| | | |
|---|---|---|
| CN | 106782307 A | 5/2017 |
| CN | 106847157 A | 6/2017 |
| CN | 107045863 A | 8/2017 |

\* cited by examiner

GRAY SCALE ADJUSTMENT METHOD AND DEVICE FOR DISPLAY PANEL

CROSS-REFERENCE TO RELATED APPLICATIONS

This application is a U.S. national Stage of International Application No. PCT/CN2018/092942, filed on Jun. 26, 2018, designating the United States, which claims priority to Chinese Patent Application No. 201710497582.2, filed with the Chinese Patent Office on Jun. 26, 2017 and entitled "GRAY SCALE ADJUSTMENT METHOD AND DEVICE FOR DISPLAY PANEL", the content of each of which is hereby incorporated by reference in its entirety.

FIELD

The present application relates to the field of liquid crystal panel display, and more particularly, to a gray scale adjustment method and device for a display panel.

BACKGROUND

Due to the complicated production process and difficult control of the liquid crystal panel, unevenness of luminance display (also called mura phenomenon) is likely to occur during the production process, that is, a certain area of the panel is block-shaped which is a trace phenomenon due to the difference in display luminance, reducing the quality level of the panel. In recent years, with the popularity of TVs such as 2K TV and 4K TV, the unevenness phenomenon has become more and more serious. To solve the unevenness phenomenon, the technique of eliminating unevenness (also called Demura technology) has emerged at the right moment. The technique of eliminating unevenness belongs to a kind of external compensation technology, and currently this technology is mainly to illuminate the backplane, through the CCD (Charge-coupled Device) optical camera to extract the luminance signal, and detect the unevenness of the display image. Based on the central area of the panel, by comparing the difference between the luminance of the other areas of the panel and the central area, and then calculating the display data to be compensated according to the standard Gamma2.2 curve (the gamma value of most displays is 2.2), the luminance of the whole panel is uniform.

At present, the technology of eliminating unevenness has the advantages of simple structure and flexible mode, so it is widely used at the present stage. However, the premise of calculating the compensation data is that the panel has already had a standard Gamma2.2 curve, but it is impossible to achieve precise control of the Gamma curve of each piece during the actual production process of the panel, which causes the uneven gray scale compensation value to be inaccurate and easily affects the final effect of Demura.

The above content is only used to assist in understanding the technical solutions of the present application, and does not constitute an admission that the above is prior art.

SUMMARY

The main purpose of the present application is to provide a gray scale adjustment method and device for a display panel, and to solve the problem that in the process of manufacturing the liquid crystal display panel, the uneven (mura) compensation value is not accurate, resulting in poor final effect of elimination of unevenness.

To achieve the above objective, the present application provides a gray scale adjustment method for a display panel. The method includes the following steps:

performing an image acquisition on the display panel to obtain a current image;

identifying an uneven block in the current image by using a distinguishing method, and detecting an original output luminance and an original input gray scale of the uneven block, wherein the distinguishing method is to identify a block of the current image in which a sum of gray scale values of all pixels exceeds a target value range or identify a block of the current image in which a sum of gray scale values of all pixels is lower than a target value range;

determining a target input gray scale corresponding to a preset target luminance according to an actual gamma curve value, wherein the actual gamma curve value is obtained by testing the display panel; and taking a difference between the original input gray scale and the target input gray scale as a gray scale compensation value of the uneven block.

Alternatively, before determining the target input gray scale corresponding to the preset target luminance according to the actual gamma curve value, the method further includes:

obtaining n reference images of the display panel at different input gray scales, wherein n is an integer greater than or equal to 2.

Alternatively, after obtaining the n reference images of the display panel at different input gray scales, the method further includes: calculating a reference gamma curve value of each reference image.

Alternatively, after calculating the reference gamma curve value of each reference image, the method further includes: taking an average value of the reference gamma curve value as the actual gamma curve value.

Alternatively, calculating the reference gamma curve value of each reference image specifically includes:

detecting a reference input gray scale and a reference output luminance of each reference image; and calculating a reference gamma curve value of each reference image according to the reference input gray scale, a reference output luminance, and a gamma mathematical model.

Alternatively, the gamma mathematical model presents a correspondence between the reference input gray scale and the reference output luminance.

Alternatively, the gamma mathematical model is:

$$\frac{Tx - To}{T255 - To} = \left(\frac{Lx}{255}\right)^{Gamma},$$

wherein Tx is the reference output luminance, T255 is a corresponding output luminance when the input gray scale is 255, To is a corresponding output luminance when the input gray scale is 0, Lx is the reference input gray scale, and Gamma is the actual gamma curve value.

Alternatively, the n is an integer greater than or equal to 5.

Alternatively, before determining the target input gray scale corresponding to the preset target luminance according to the actual gamma curve value, the method further includes:

obtaining an output luminance of a center point of the current image; and taking the output luminance of the center point of the current image as a preset target luminance.

Alternatively, before determining the target input gray scale corresponding to the preset target luminance according to the actual gamma curve value, the method further includes:

obtaining the output luminance of each pixel in the area other than the uneven area in the current image.

Alternatively, after the obtaining the output luminance of each pixel in areas other than the uneven area in the current image, the method further includes: taking the average value of the obtained output luminance as a preset target luminance.

Alternatively, after taking the difference between the original input gray scale and the target input gray scale as the gray scale compensation value of the uneven block, the method further includes:

transmitting the gray scale compensation value to the display panel, so that the display panel adds the gray scale compensation value to the original input gray scale of the uneven block as a new input gray scale of the uneven block to eliminate the uneven block in the current image.

In addition, in order to achieve the above object, the present application further provides a gray scale adjustment device for a display panel, the device including:

an image acquisition module, configured to perform an image acquisition on the display panel to obtain a current image;

an identification module, configured to identify the uneven block in the current image by using a distinguishing method, and to detect an original output luminance and an original input gray scale of the uneven block, wherein the distinguishing method is to identify a block of the current image in which a sum of gray scale values of all pixels exceeds a target value range or identify a block of the current image in which a sum of gray scale values of all pixels is lower than a target value range;

a calculation module, configured to determine a target input gray scale corresponding to a preset target luminance according to an actual gamma curve value, wherein the actual gamma curve value is obtained by testing the display panel; and an adjustment module, configured to take a difference between the original input gray scale and the target input gray scale as a gray scale compensation value of the uneven block.

Alternatively, in the gray scale adjustment device, before determining the target input gray scale corresponding to the preset target luminance according to the actual gamma curve value, n reference images of the display panel at different input gray levels are obtained, and the n is an integer greater than or equal to 2.

Alternatively, in the gray scale adjustment device, after obtaining n reference images of the display panel at different input gray levels, a reference gamma curve value of each reference image is calculated.

Alternatively, in the gray scale adjustment device, calculating the reference gamma curve value of each reference image specifically includes:

detecting a reference input gray scale and a reference output luminance of each reference image; and calculating the reference gamma curve value of each reference image according to the reference input gray scale, a reference output luminance, and a gamma mathematical model.

Alternatively, in the gray scale adjustment device, the gamma mathematical model presents a correspondence between the reference input gray scale and the reference output luminance.

Alternatively, in the gray scale adjustment device, the gamma mathematical model is:

$$\frac{Tx - To}{T255 - To} = \left(\frac{Lx}{255}\right)^{Gamma},$$

wherein Tx is the reference output luminance, T255 is a corresponding output luminance when the input gray scale is 255, To is a corresponding output luminance when the input gray scale is 0, Lx is the reference input gray scale, and Gamma is the actual gamma curve value.

Alternatively, in the gray scale adjustment device, the n is an integer greater than or equal to 5.

In addition, in order to achieve the above object, the present application further provides a display device including a display panel and a gray scale adjustment device for a display panel as described above.

The method for adjusting the gray scale of the display panel proposed in the present application can compensate the gray scale value of the uneven area of the display panel according to the actual gamma curve and the preset target luminance during the process of producing each liquid crystal panel, and eliminate accurately and effectively the unevenness in the display panel, thereby solving the problem that in the process of manufacturing the liquid crystal display panel, the uneven (mura) compensation value is not accurate, resulting in poor final effect of elimination of unevenness.

The implementation, functional features, and advantages of the present application will be further described with reference to the accompanying drawings.

DETAILED DESCRIPTION OF THE INVENTION

It should be understood that the specific embodiments described herein are merely illustrative of the application and are not intended to limit the present application.

Figure 1:
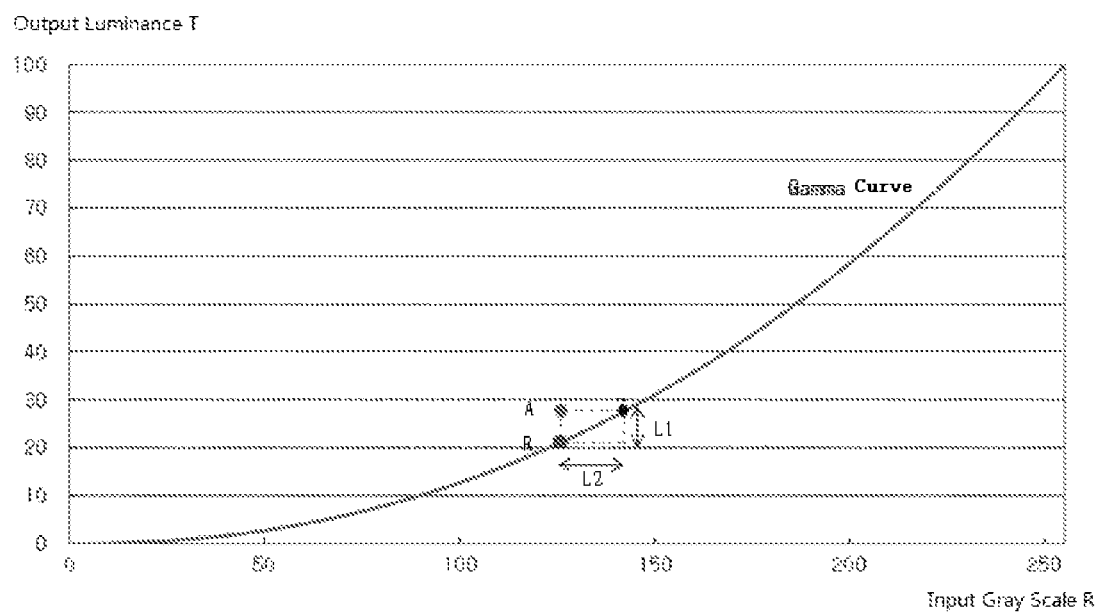
FIG. 1 is a schematic diagram illustrating a conventional acquisition method of a display panel gray scale compensation value.

At present, the technology of eliminating the unevenness (also called Demura technology) has the advantages of simple structure and flexible mode, so it is widely used at this stage. However, the premise of calculating compensation data is that the panel has already had a standard Gamma 2.2 curve, it is impossible to achieve precise control of the Gamma curve of each piece during the actual production process of the panel, which causes the uneven gray scale compensation value to be inaccurate and easily affects the final effect of Demura technology. As shown in FIG. 1, it is the principle of calculating compensation data for the commonly used Demura technology. As the Gamma curve in FIG. 1, the abscissa is the input gray scale L (i.e., the objective physical quantity of things), and the ordinate is the output luminance T (i.e., subjective luminance perception of the human eye). At this stage, in order to facilitate the calculation, it will assume that this gamma curve is 2.2, the point T in the figure represents the target luminance, and the point R represents the actual luminance of the uneven area. Then in order to increase the luminance of the uneven area to the target luminance of the display panel (that is, finally reaching the effect of obtaining a compensated luminance L1 as shown in the figure), it is necessary to obtain the compensation gray scale L2 corresponding to the abscissa on the curve of Gamma 2.2. The shortcoming of this approach is that if the actual Gamma curve of the panel is not 2.2, then the compensation effect will be biased, and even the uneven (mura) phenomenon will not be improved.

Figure 2:
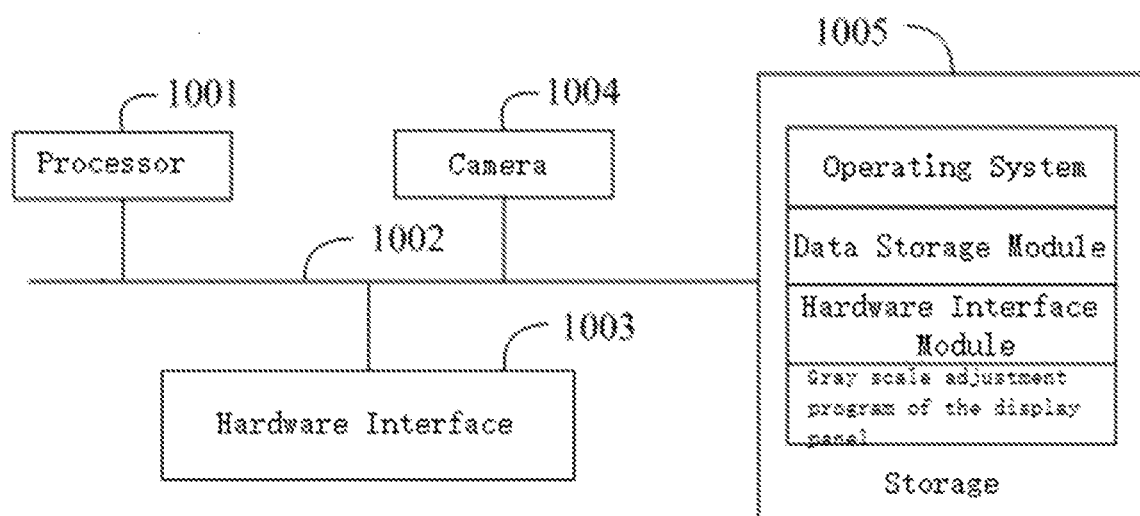
FIG. 2 is a schematic structural diagram illustrating a gray scale adjustment device for a display panel of a hardware operating environment according to an embodiment of the present application.

Referring to FIG. 2, FIG. 2 is a schematic structural diagram illustrating a gray scale adjustment device for a display panel in a hardware operating environment according to an embodiment of the present application.

As shown in FIG. 2, the device may include a processor 1001, such as a CPU, a communication bus 1002, a user interface 1003, a camera 1004, and a memory 1005. The communication bus 1002 is used to implement connection communication between these components. The hardware interface 1003 may include a liquid crystal display panel. The camera 1004 can be selected as a camera of a high-precision, high-resolution optical CCD camera that can achieve the resolution of the human eye. The memory 1005 may be a high speed RAM memory or a non-volatile memory, and may include an EEPROM (Electrically Erasable Programmable Read-Only Memory).

It will be understood by those skilled in the art that the device configuration illustrated in FIG. 2 does not constitute a limitation to the device, and more or less components than those illustrated may be included, or some components may be combined, or different component arrangements may be adopted.

As shown in FIG. 2, the memory 1005 as a computer storage medium may include an operating system, a data storage module, a hardware interface module, and a gray scale adjustment program for the display panel.

In the device shown in FIG. 2, the camera 1004 is configured to perform image acquisition on the display panel. The hardware interface 1003 is mainly used for data interaction with the display panel. The processor 1001 and the memory 1005 of the device of the present application may be disposed in the device. The device may call the gray scale adjustment program for the display panel stored in the memory 1005 by the processor 1001, and perform the following operations:

performing an image acquisition on the display panel to obtain a current image;

identifying an uneven block in the current image, and detecting an original output luminance and an original input gray scale of the uneven block;

determining a target input gray scale corresponding to a preset target luminance according to an actual gamma curve value obtained by testing the display panel; and taking a difference between the original input gray scale and the target input gray scale as a gray scale compensation value of the uneven block.

Further, the processor 1001 may call the gray scale adjustment program for the display panel stored in the memory 1005, and further perform the following operations:

obtaining n reference images of the display panel at different input gray scales, wherein n is an integer greater than or equal to 2;

calculating the reference gamma curve value of each reference image; and taking an average value of the reference gamma curve value as the actual gamma curve value.

Further, the processor 1001 may call the gray scale adjustment program for the display panel stored in the memory 1005, and further perform the following operations:

detecting a reference input gray scale and a reference output luminance of each reference image; and calculating a reference gamma curve value of each reference image according to the reference input gray scale, a reference output luminance, and a gamma mathematical model which presents a correspondence between the reference input gray scale and the reference output luminance.

Further, the processor 1001 may call the gray scale adjustment program for the display panel stored in the memory 1005, and further perform the following operations:

obtaining an output luminance of a center point of the current image, and taking the output luminance of the center point of the current image as a preset target luminance.

Further, the processor 1001 may call the gray scale adjustment program for the display panel stored in the memory 1005, and further perform the following operations:

obtaining the output luminance of each pixel in areas other than the uneven area in the current image; and taking the average value of the obtained output luminance as a preset target luminance.

Further, the processor 1001 may call the gray scale adjustment program for the display panel stored in the memory 1005, and further perform the following operations:

transmitting the gray scale compensation value to the display panel, so that the display panel adds the gray scale compensation value to the original input gray scale of the uneven block as a new input gray scale of the uneven block to eliminate the uneven block in the current image.

In the embodiment of the present application, image acquisition is performed on the display panel to obtain a current image; the uneven block in the current image is identified, and the original input gray scale and the original output luminance of the uneven block are detected; a target input gray scale corresponding to a preset target luminance is determined according to an actual gamma curve value, and the actual gamma curve value is obtained by testing the display panel; and a difference between the original input gray scale and the target input gray scale is taken as a gray scale compensation value of the uneven block. The present embodiment solves the problem that in the process of manufacturing the liquid crystal display panel, the uneven (mura) compensation value is not accurate, resulting in poor final effect of elimination of unevenness by the technical solution of the embodiment of the present application.

Based on the above hardware configuration, an embodiment of a gray scale adjustment method for the display panel according to the present application is proposed.

Figure 3:
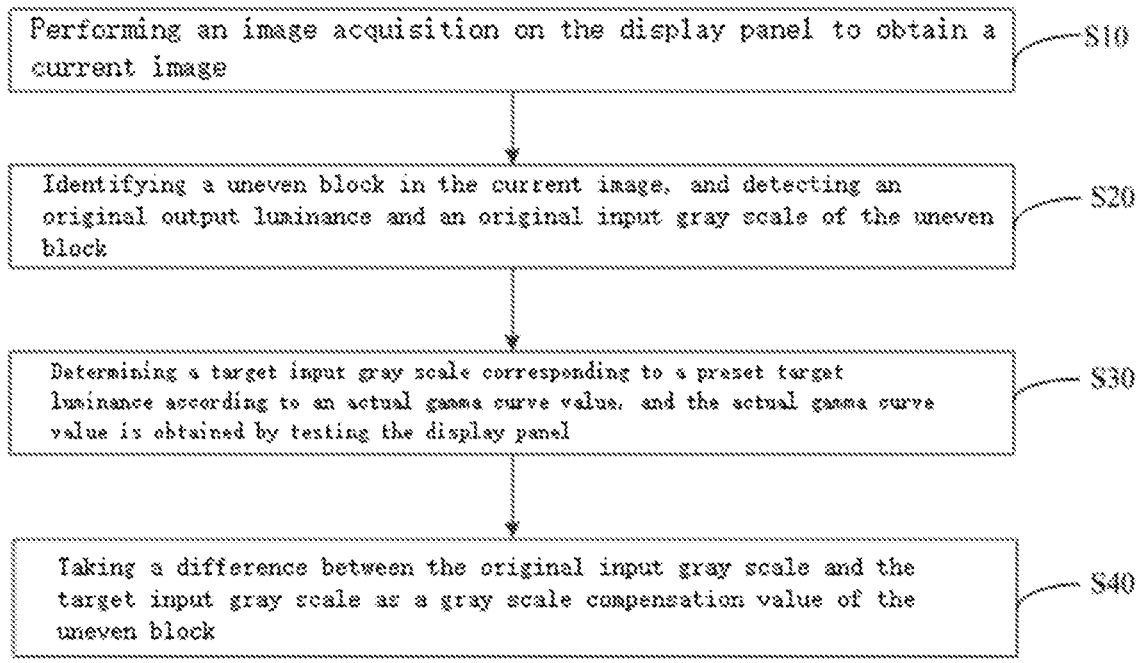
FIG. 3 is a schematic flow chart illustrating a first embodiment of a gray scale adjustment method of a display panel according to the present application.

Referring to FIG. 3, FIG. 3 is a schematic flow chart illustrating a first embodiment of a gray scale adjustment method for a display panel according to the present application.

In this embodiment, the method includes the following steps.

At S10, an image acquisition is performed on the display panel to obtain a current image.

It can be understood that the current image is an image currently displayed the display panel.

In a specific implementation, after the display panel is illuminated, the current display image (i.e., the current image) can be captured by the optical CCD camera.

It should be noted that the display panel in this embodiment may be a liquid crystal display panel, and the liquid crystal display panel can be applied to a display device such as computer display screen, television display screen, and tablet computer display screen.

At S20, an uneven block in the current image is identified, and an original output luminance and an original input gray scale of the uneven block are detected.

More specifically, at the process S20, an uneven block in the current image is identified by a distinguishing method, and the distinguishing method is to identify a block of the current image in which a sum of gray scale values of all pixels exceeds a target value range or identify a block of the current image in which a sum of gray scale values of all pixels is lower than a target value range.

Through the setting of the target value range, it is possible to reduce the time required for detecting the produced display panel before selecting the uneven block, and at the same time, the setting of the target value range is accessible by the production end to make the production end more flexible to regulate production and testing processes.

It should be noted that the luminance signal includes an input gray scale and an output luminance. The input gray scale is a gray scale that the display can identify, and the gray scale represents an actual objective luminance, that is, the natural physical quantity of an objective object, and the display will continuously acquire different input voltages (also called gamma voltages), and the gray scales reflected by different input voltages are different. The output luminance is subjective luminance perception of the human eye. Since human perception of the stimuli from nature is non-linear, the outside world strengthens the stimuli in a certain proportion. For a human, this stimuli is evenly increased. Similarly, the human eye is also nonlinear in perception of natural luminance, so the subjective luminance of the people eye perception is not exactly the same as the actual objective luminance. The gamma curve (i.e., the gamma curve) is used to coordinate the mapping relationship between the subjective luminance perception of the human eye and the actual objective natural luminance, i.e., to coordinate the mapping relationship between the output luminance and input gray scale, and the relationship between them can be determined by a formula: output value=input value$^{Gamma}$.

It can be understood that the output luminance value of the initial display image (i.e., the subjective luminance perception of the human eye) is known, and the gray scale value of the initially displayed image (i.e., the input gray scale) is also known, but the display screen is displayed unevenly under this gray scale, that is, there is unevenness. When detecting the uneven block, some unevenness which is obvious is visible to the human eye, while some unevenness is not visible to the human eye. The professional device detects and identifies the uneven block in the current image by professional equipment, that is, the pixel (pixel) distribution feature is analyzed according to the display data in the collected current image, and the unevenness is identified according to the relevant algorithm. There are many related algorithms in the process of detecting unevenness, which are not limited by the embodiment.

At S30, a target input gray scale corresponding to a preset target luminance according to an actual gamma curve value is determined, and the actual gamma curve value is obtained by testing the display panel.

It should be noted that, in this embodiment, there is an even luminance display area in the current image, and the output luminance value of the display area is used as the preset target luminance value.

In a specific implementation, an output luminance of a panel center point of the current image may be obtained, and the output luminance of the panel center point may be used as a preset target luminance. That is, the output luminance of the current image in a central area of the panel is obtained, and the central area of the panel is taken as a reference so that the luminance of the central area is compared to the luminance of other areas of the panel to get the difference in luminance between the central area and the other areas. In the actual production of the display panel, the center point of the display panel is generally a place with a best optical grade. Therefore, when a panel is to be debugged, the center point of the panel is generally selected for debugging.

Alternatively, the output luminance of pixels in areas other than the uneven area in the current image may be obtained, the average value of the output luminance of the pixels may be calculated, and the average value of the output luminance may be taken as a preset target luminance.

At S40, a difference between the original input gray scale and the target input gray scale is taken as a gray scale compensation value of the uneven block.

Figure 4:
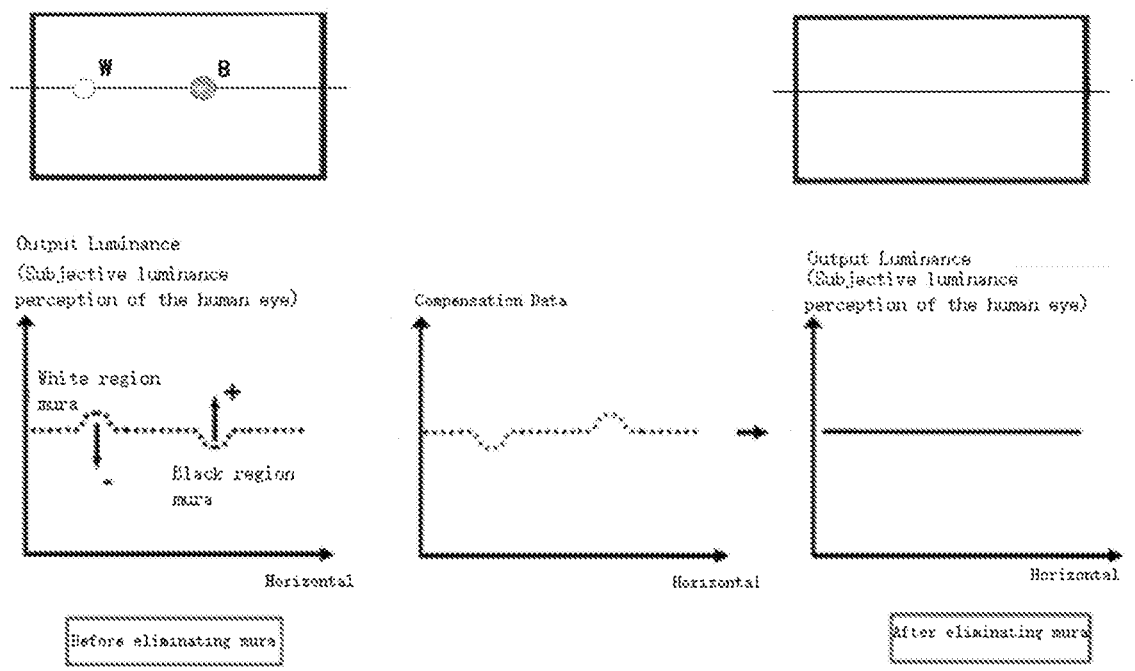
FIG. 4 is a schematic diagram illustrating a principle for eliminating an uneven area of a display panel according to an embodiment of the present application.

It can be understood that, referring to FIG. 4, it is assumed that the picture on the left side illustrates a white block unevenness W and a black block unevenness B in the horizontal direction. The difference between the original (input) gray scale value and the target gray scale is taken as the compensation data (i.e., the gray scale compensation value) of the uneven block by performing the above step S40, and data compensation is performed on the two regions, that is, the display data of these regions is the sum of the original display data and the compensation data, the compensation data of the unevenness of the white block is negative (i.e., the display data will be reduced), and the data corresponding to unevenness of the black block will be increased accordingly, so that even luminance can be obtained finally, and unevenness can be eliminated.

Figure 5:
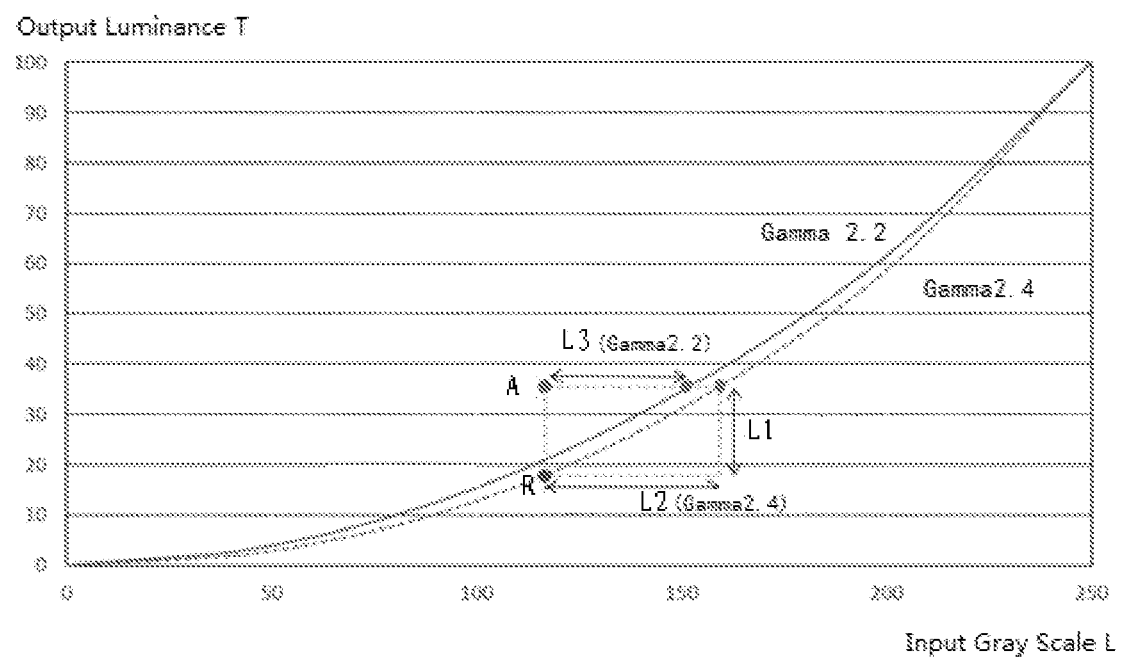
FIG. 5 is a schematic diagram illustrating a principle for performing data compensation on an uneven area of a display panel according to an embodiment of the present application.

In the specific implementation, referring to FIG. 5, it is assumed that the measured actual Gamma curve value of the panel is 2.4. The dotted line is the Gamma 2.4 curve, and the solid line is the Gamma 2.2 curve. It can be seen that the same luminance difference L1 is compensated for the Gamma 2.2 curve and the Gamma 2.4 curve. The compensated gray scale value L3 obtained under the Gamma 2.2 curve is different from the compensated gray scale value L2 obtained under the Gamma 2.4 curve, that is, the compensated gray scale values obtained by different Gamma curves are different, and the compensated gray scale L3 on the Gamma 2.2 curve is smaller than the compensated gray scale value L2 on the actual Gamma 2.4 curve, so only compensation that meets the characteristics of the panel itself is optimal.

After the step S40, the obtained gray scale compensation value may be written to an electrically erasable programmable read only memory (EEPROM) to achieve a compensation effect of the current image, that is, the gray scale compensation value is transmitted to the display panel, so that the display panel adds the gray scale compensation value to the original input gray scale of the uneven block as a new input gray of the uneven block to eliminate uneven blocks in the current image (mura phenomenon).

In the process of manufacturing each liquid crystal panel in this embodiment, the gray scale value compensation is performed on the uneven area of the display panel according to the actual gamma curve and the preset target luminance, thereby achieving the most accurate compensation effect, and the unevenness (mura) is accurately and effectively eliminated in the display panel.

Figure 6:
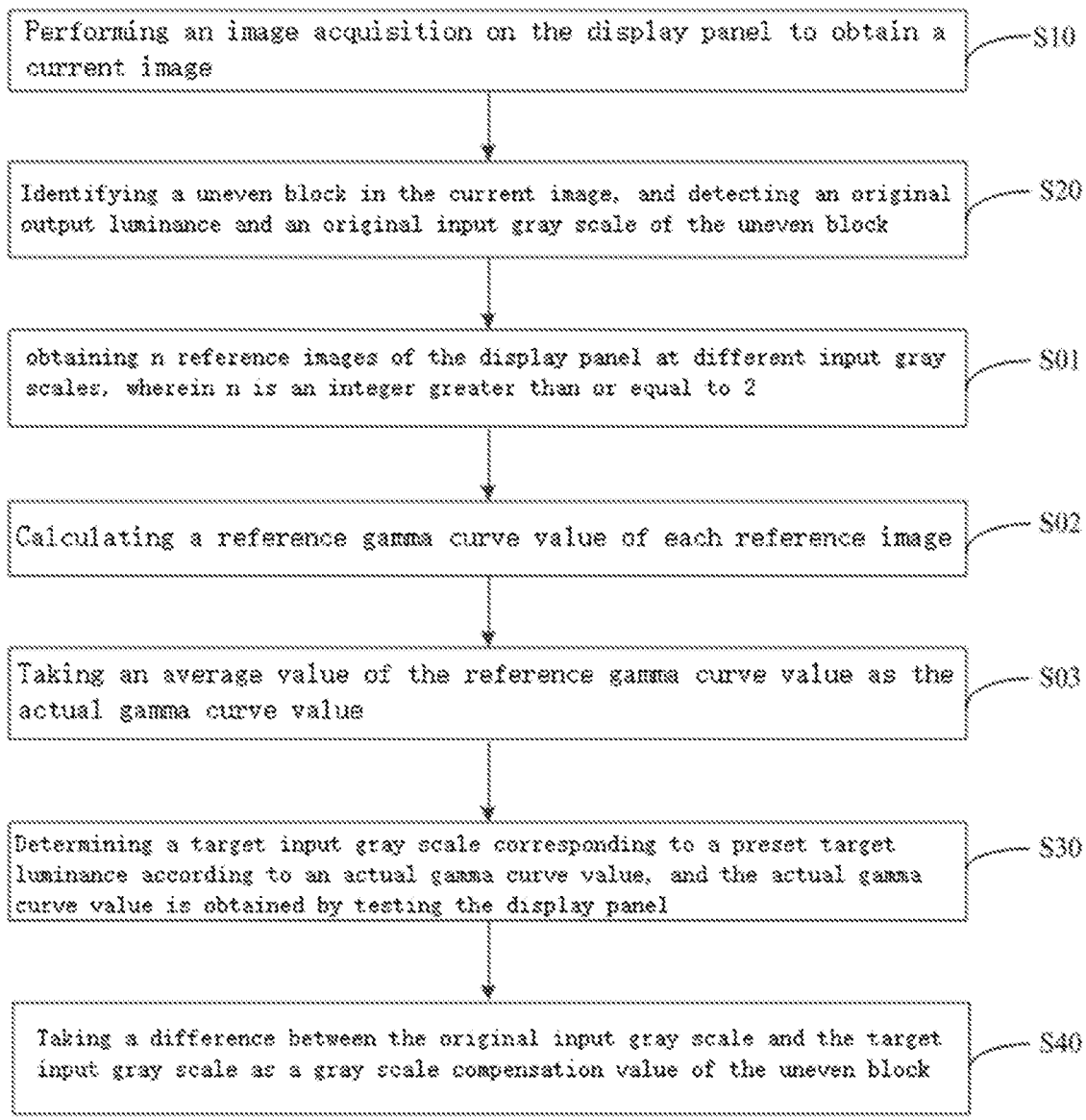
FIG. 6 is a schematic flow chart illustrating a second embodiment of a gray scale adjustment method of a display panel according to the present application.

Referring to FIG. 6, a second embodiment of a gray scale adjustment method for a display panel according to the present invention is based on the first embodiment of the foregoing method, and FIG. 6 is based on the embodiment shown in FIG. 3.

In this embodiment, before determining the target input gray scale corresponding to the preset target luminance according to the actual gamma curve value in the step S30, the method further includes the following steps.

At S01: n reference images of the display panel at different input gray scales is obtained, wherein n is an integer greater than or equal to 2.

In a specific implementation, after the driving circuit lights up the display panel, the initial display state (i.e., the current image) of the current display panel can be captured by the high-resolution resolution CCD camera, the CCD camera additionally captures the image information of the display state of the current display panel at different gray scale values, and the image information of different gray scale values is taken as reference images. Uneven regions in the reference images are identical to the uneven regions of the initial display states (i.e., the current image).

Depending on the actual needs, an original CCD camera may be used to take additional five or more reference images. For example, take five reference images as an example. These five images are taken by taking five gray scale values from the image in the front display panel: the first image takes a gray scale value of 0, the fifth image takes a gray scale value of 255, and the middle three images take three different gray scale values. In addition, increasing the number of images taken does not result in too much work and difficulty, and is simple and easy.

At S02, a reference gamma curve value of each reference image is calculated.

In this embodiment, the middle three reference images mentioned above may be detected to extract corresponding reference input gray scale values and reference output luminances. Then a reference gamma curve value of each reference image is calculated according to the above reference input gray scale values, reference output luminances, and gamma mathematical models. The gamma mathematical model presents a correspondence between the reference input gray scale value and the reference output luminance.

It can be understood that mapping relationship between the input gray scale value of each reference image (that is, it can represent the gamma voltage, i.e., the objective physical quantity of the object computer recognized) and the output luminance value (i.e., the subjective luminance perception of the human eye) is nonlinear (i.e., the gamma curve can reflect this mapping relationship between them, and this mapping relationship can also be called gamma mathematical model). This nonlinear mapping relationship may be generally represented by the following formula by default: Output Luminance=Input Gray Scale$^{Gamma}$. It can be seen from the above that the input gray scale value of each reference image is known. Meanwhile, since the reference image is obtained by a CCD camera, the output luminance value of each reference image can be measured, and the output luminance value is also known. Therefore, the gamma value of each reference image can be obtained by the formula i.e., Output Luminance=Input Gray Scale$^{Gamma}$. The gamma values of the respective reference images may not be necessarily the same, and there may be some errors between them.

In a specific implementation, the gamma mathematical model is represented by:

$$\frac{Tx - To}{T255 - To} = \left(\frac{Lx}{255}\right)^{Gamma},$$

wherein Tx is the reference output luminance, T255 is a corresponding output luminance when the input gray scale is 255, To is a corresponding output luminance when the input gray scale is 0, Lx is the reference input gray scale, and Gamma is the actual gamma curve value.

The embodiment introduces the gamma mathematical model such that the value of the gamma curve of each reference image obtained by calculation is closer to the value of the actual gamma curve of the current display panel. The gamma curve value of each reference image is calculated by the above formula, and the error between the calculated result and the actual gamma curve value of the display panel can be further reduced.

At S03, an average value of the reference gamma curve values is taken as the actual gamma curve value.

It can be understood that, as can be seen from the above, there is an error in the gamma curve values of each reference image obtained by calculation, so by obtaining the gamma curve corresponding to the average value of their gamma curve values, the gamma curve closet to the actual condition of the panel can be obtained. This gamma curve is taken as the actual gamma curve, and the actual gamma curve is used as a reference to find the compensation value actually needed for each uneven region in the current image of the display panel. In this way, the most accurate compensation can be achieved.

In this embodiment, the actual gamma curve of the display panel is measured in advance, for example, by taking images of the display panel at different gray scales, combining the gamma mathematical model to detect the reference gamma curve value of the display panel at different gray scales, and taking the average value of the reference gamma curve value as the actual gamma curve value closest to the actual condition of the display panel. The actual gamma curve of the display panel can be effectively obtained during the production of the display panel, thereby enabling to obtain the gray scale compensation value of the uneven area more precisely.

Figure 7:
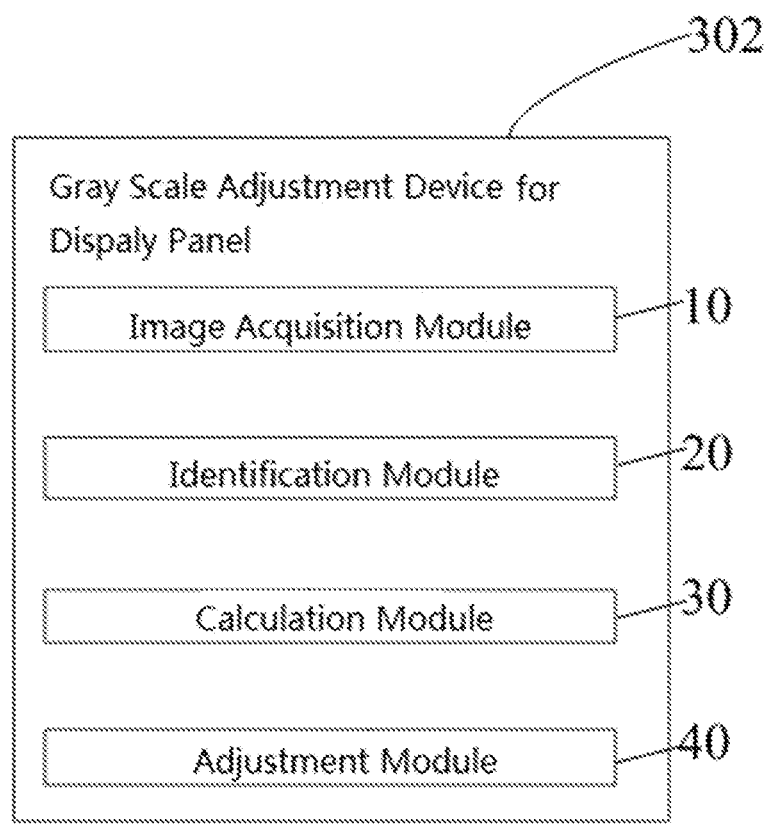
FIG. 7 is a schematic block diagram illustrating a gray scale adjustment method of a display panel according to an embodiment of the present disclosure.

FIG. 7 is a schematic block diagram illustrating a gray scale adjustment device for a display panel according to an embodiment of the present disclosure. The gray scale adjustment device 302 for the display panel includes the following configuration.

An image acquisition module 10 is configured to perform an image acquisition on the display panel to obtain a current image.

It can be understood that the current image is the current display image of the display panel;

In a specific implementation, after the display panel is light, the current display image (i.e., the current image) can be captured by the optical CCD camera.

It should be noted that the display panel in this embodiment may be a liquid crystal display panel, and the liquid crystal display panel can be applied to a display device such as a computer display screen, a television display screen, and a tablet computer display screen.

An identification module 20 is configured to identify an uneven block in the current image and detect an original output luminance and an original input gray scale of the uneven block.

It can be understood that unevenness may occur in the current display image displayed on the display panel during the process of producing the display panel (that is, there may be an uneven block appearing). When the image of the display panel is acquired, the luminance signal of the uneven block in the current image is extracted.

It should be noted that the luminance signal includes an input gray scale and an output luminance. The input gray scale is a gray scale which is identifiable to the display, and the gray scale represents an actual objective luminance, that is, a natural physical quantity of an objective object. The display will continuously acquire different input voltages (also called gamma voltages). The gray scales reflected by different input voltages are different. The output luminance is subjective luminance perception of the human eye. Since human perception of the stimuli of nature is non-linear, the outside world strengthens the stimuli in a certain proportion. For people, this stimuli is evenly increased. Similarly, the human eye is also nonlinear in perception of natural luminance, so the subjective luminance of the people eye perception is not exactly the same as the actual objective luminance. The gamma curve (i.e., the gamma curve) is used to coordinate the mapping relationship between the subjective luminance perception of the human eye and the actual objective natural luminance, i.e., to coordinate the mapping relationship between the output luminance and the input gray scale, and the relationship between them can be represented by the formula: Output Value=Input Value$^{Gamma}$.

It can be understood that the output luminance value of the initial display image (i.e., the subjective luminance perception of the human eye) is known, and the gray scale value of the initially displayed image (i.e., the input gray scale) is also known, but the display screen is displayed unevenly under this gray scale, that is, there is unevenness. When detecting the uneven block, some unevenness which is visible to the human eye is obvious, which some unevenness is not visible to the human eye. The professional device detects and identifies the uneven block in the current image by the machine, that is, the pixel (pixel) distribution feature is analyzed according to the display data in the acquired current image, and the unevenness is identified according to the relevant algorithm. There are many related algorithms in the process of detecting unevenness, which are not limited by the embodiment.

A calculation module 30 is configured to determine a target input gray scale corresponding to a preset target luminance according to an actual gamma curve value, wherein the actual gamma curve value is obtained by testing the display panel.

It should be noted that, in this embodiment, there is an even luminance display area in the current image, and the output luminance value of the display area is used as the preset target luminance value.

In a specific implementation, an output luminance of a panel center point of the current image may be obtained, and the output luminance of the panel center point may be used as a preset target luminance. That is, the output luminance of the current image in a central area of the panel is obtained, and the central area of the panel is taken as a reference so that the luminance of the central area is compared to the luminance of other areas of the panel to get the difference in luminance between the central area and the other areas. In the actual production of the display panel, the center point of the display panel is generally a place with a best optical grade. Therefore, when a panel is to be debugged, the center point of the panel is generally selected for debugging.

Alternatively, the output luminance of pixels in areas other than the uneven area in the current image may be obtained, the average value of the output luminance of the pixels may be calculated, and the average value of the output luminance may be taken as a preset target luminance.

An adjustment module 40 is configured to take a difference between the original input gray scale and the target input gray scale as a gray scale compensation value of the uneven block.

It can be understood that, referring to FIG. 4, it is assumed that the picture on the left side illustrates a white block unevenness W and a black block unevenness B in the horizontal direction. The adjustment module 40 takes the difference between the original (input) gray scale value and the target gray scale as the compensation data (i.e., the gray scale compensation value) of the uneven block, and data compensation is performed on the two regions, that is, the display data of these regions is the sum of the original display data and the compensation data, the compensation data of white uneven block is negative (i.e., the display data will be reduced), and the data corresponding to the black block unevenness will be increased accordingly, so that even luminance can be obtained finally, and unevenness can be eliminated.

In the specific implementation, referring to FIG. 5, it is assumed that the measured panel actual Gamma curve value is 2.4. The dotted line is the Gamma 2.4 curve, and the solid line is the Gamma 2.2 curve. It can be seen that the same luminance difference L1 is compensated for the Gamma 2.2 curve and the Gamma 2.4 curve. The compensated gray scale value L3 obtained under the Gamma 2.2 curve is different from the compensated gray scale value L2 obtained under the Gamma 2.4 curve, that is, the compensated gray scale values obtained by different Gamma curves are different, and the compensated gray scale L3 on the Gamma2.2 curve is smaller than the compensated gray scale value L2 on the actual Gamma 2.4 curve, so only compensation that meets the characteristics of the panel itself is optimal. Finally, the obtained gray scale compensation value is written to an electrically erasable programmable read only memory (EEPROM) to realize the compensation effect of the current image, that is, the gray scale compensation value is transmitted to the display panel, so that the display panel adds the gray scale compensation value to the original input grayscale of the uneven block as a new input grayscale of the uneven block to the eliminate uneven block in the current image (mura phenomenon).

Figure 8:
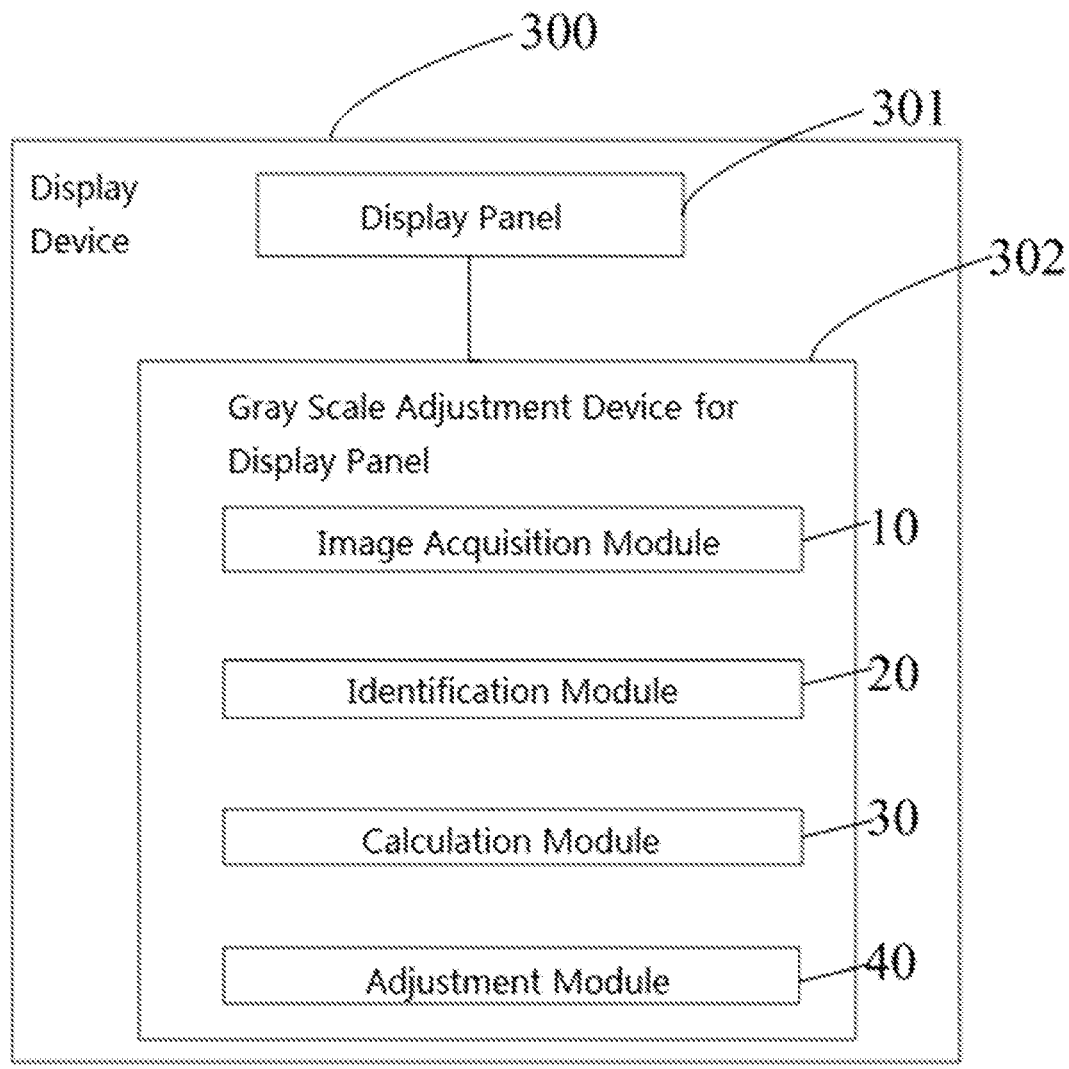
FIG. 8 is a schematic block diagram illustrating a display device according to an embodiment of the present application.

FIG. 8 is a schematic block diagram illustrating a display device according to an embodiment of the present application. As shown in the figure, the display device 300 may include a display panel 301 and a gray scale adjustment device 302 for the display panel, and the gray scale adjustment device 302 for the display panel includes:

an image acquisition module 10, configured to perform an image acquisition on the display panel to obtain a current image;

an identification module 20, configured to identify the uneven block in the current image by using a distinguishing method, and to detect an original output luminance and an original input gray scale of the uneven block, wherein the distinguishing method is to identify a block of the current image in which a sum of gray scale values of all pixels exceeds a target value range or identify a block of the current image in which a sum of gray scale values of all pixels is lower than a target value range;

a calculation module 30, configured to determine a target input gray scale corresponding to a preset target luminance according to an actual gamma curve value, wherein the actual gamma curve value is obtained by testing the display panel; and an adjustment module 40, configured to take a difference between the original input gray scale and the target input gray scale as a gray scale compensation value of the uneven block.

In a display device according to an embodiment of the present application, before determining the target input gray scale corresponding to the preset target luminance according to an actual gamma curve value, n reference images of the display panel at different input gray levels may be obtained. The n is an integer greater than or equal to 2.

In a display device according to an embodiment of the present application, after obtaining the n reference images of the display panel at different input gray levels, a reference gamma curve value of each reference image may be calculated.

In a display device that is further provided by the embodiment of the present application, the calculating the reference gamma curve value of each reference image specifically includes:

detecting a reference input gray scale and a reference output luminance of each reference image; and calculating the reference gamma curve value of each reference image according to the reference input gray scale, a reference output luminance, and a gamma mathematical model.

In a display device that is further provided by the embodiment of the present application, the gamma mathematical model presents a correspondence between the reference input gray scale and the reference output luminance.

In a display device that is further provided by the embodiment of the present application, the gamma mathematical model is:

$$\frac{Tx - To}{T255 - To} = \left(\frac{Lx}{255}\right)^{Gamma},$$

wherein Tx is the reference output luminance, T255 is a corresponding output luminance when the input gray scale is 255, To is a corresponding output luminance when the input gray scale is 0, Lx is the reference input gray scale, and Gamma is the actual gamma curve value.

In a display device that is further provided by the embodiment of the present application, the n is an integer greater than or equal to 5.

It should be noted that the display panel in this embodiment may be a liquid crystal display panel, and the liquid crystal display panel can be applied to a display device such as a computer display screen, a television display screen, and a tablet computer display screen.

In the process of manufacturing each liquid crystal panel, the gray scale value compensation is performed on the uneven area of the display panel according to the actual gamma curve and the preset target luminance, thereby achieving the most accurate compensation effect, and the unevenness (mura) is accurately and effectively eliminated in the display panel.

In addition, the embodiment of the present application further provides a computer readable storage medium storing a gray scale adjustment program for the display panel. When the gray scale adjustment program for the display panel is executed by the processor, the following operation are implemented:

performing an image acquisition on the display panel to obtain a current image;

identifying an uneven block in the current image, and detecting an original output luminance and an original input gray scale of the uneven block;

determining a target input gray scale corresponding to a preset target luminance according to an actual gamma curve value, wherein the actual gamma curve value is obtained by testing the display panel;

taking a difference between the original input gray scale and the target input gray scale as a gray scale compensation value of the uneven block.

Further, when the gray scale adjustment program of the display panel is executed by the processor, the following operations are also implemented:

obtaining n reference images of the display panel at different input gray scales, wherein n is an integer greater than or equal to 2;

calculating the reference gamma curve value of each reference image; and taking an average value of the reference gamma curve value as the actual gamma curve value.

Further, when the gray scale adjustment program of the display panel is executed by the processor, the following operations are also implemented:

detecting a reference input gray scale and a reference output luminance of each reference image; and calculating a reference gamma curve value of each reference image according to the reference input gray scale, a reference output luminance, and a gamma mathematical model, wherein the gamma mathematical model presents a correspondence between the reference input gray scale and the reference output luminance.

Further, when the gray scale adjustment program of the display panel is executed by the processor, the following operation is also implemented:

obtaining an output luminance of a center point of the current image, and taking the output luminance of the center point of the current image as a preset target luminance.

Further, when the gray scale adjustment program of the display panel is executed by the processor, the following operations are also implemented:

obtaining the output luminance of each pixel in the area other than the uneven area in the current image; and calculating an average value of the output luminances of the pixel, and taking the average value of the obtained output luminance as a preset target luminance.

Further, when the gray scale adjustment program of the display panel is executed by the processor, the following operation is also implemented:

transmitting the gray scale compensation value to the display panel, so that the display panel adds the gray scale compensation value to the original input gray scale of the uneven block as a new input gray scale of the uneven block to eliminate the uneven block in the current image.

In the embodiment, by capturing the image of the display panel at different gray levels, and combining the gamma mathematical model, the gamma curve value of the display panel at different gray levels is detected, and the average value of the gamma curve value is taken as the closest to the actual state of the display panel. The actual gamma curve of the display panel can be effectively obtained during the production of the display panel, thereby enabling to obtain the gray scale compensation value of the uneven area more precisely, which solves the problem that the effect of eliminating the unevenness is not good since the unevenness compensation value is not accurate enough in the process of manufacturing a liquid crystal display panel.

It should be noted that the term "include", "comprising", or any other variants thereof is intended to encompass a non-exclusive inclusion, such that a process, method, article, or system that includes a plurality of elements not only includes those elements, but also includes other elements that are not explicitly listed, or elements that are inherent to such a process, method, item, or system. Without further limitation, an element defined by the phrase "comprising a . . . " does not exclude the presence of additional equivalent elements in the process, method, item, or system which include the element.

The serial numbers of the embodiments of the present application are merely for the description, and do not represent the advantages and disadvantages of the embodiments.

Through the description of the above embodiments, those skilled in the art can clearly understand that the foregoing embodiment method can be implemented by means of software plus a necessary general hardware platform, and of course, can also be through hardware, but in many cases, the former is better. Based on such understanding, the technical solution of the present application, which is essential or contributes to the prior art, may be embodied in the form of a software product stored in a storage medium (such as ROM/RAM, disk, optical disc) including a plurality of instructions for enabling a terminal device (which may be a mobile phone, a computer, a server, an air conditioner, or a network device, etc.) to perform the method described in the various embodiments of the present application.

The above is only preferred embodiments of the present application, and thus does not limit the scope of the patent application, and the equivalent structure or equivalent process transformation made by the specification and the drawings of the present application, or directly or indirectly applied to other related technical fields should be included in the scope of patent protection of this application.

The invention claimed is:

1. A gray scale adjustment method for a display panel, comprising:

performing an image acquisition on the display panel to obtain a current image;

identifying an uneven block in the current image by using a distinguishing method, and detecting an original output luminance and an original input gray scale of the uneven block, wherein the distinguishing method includes either (a) identifying a block of the current image in which a sum of gray scale values of all pixels exceeds a target value range or (b) identifying a block of the current image in which a sum of gray scale values of all pixels is lower than a target value range;

determining a target input gray scale corresponding to a preset target luminance according to an actual gamma curve value, wherein the actual gamma curve value is obtained by testing the display panel;

taking a difference between the original input gray scale and the target input gray scale as a gray scale compensation value of the uneven block; and transmitting the gray scale compensation value to the display panel, so that the display panel adds the gray scale compensation value to the original input gray scale of the uneven block as a new input gray scale of the uneven block to eliminate the uneven block in the current image.

2. The method according to claim 1, wherein before determining the target input gray scale corresponding to the preset target luminance according to the actual gamma curve value, the method further includes:

obtaining n reference images of the display panel at different input gray scales, wherein the n is an integer greater than or equal to 2.

3. The method according to claim 2, wherein after obtaining the n reference images of the display panel at different input gray scales, the method further includes:

calculating a reference gamma curve value of each reference image.

4. The method according to claim 3, wherein after calculating the reference gamma curve value of each reference image, the method further includes:

taking an average value of the reference gamma curve value as the actual gamma curve value.

5. The method according to claim 4, wherein calculating the reference gamma curve value of each reference image includes:

detecting a reference input gray scale and a reference output luminance of each reference image;

calculating the reference gamma curve value of each reference image according to the reference input gray scale, a reference output luminance, and a gamma mathematical model.

6. The method according to claim 5, wherein the gamma mathematical model presents a correspondence between the reference input gray scale and the reference output luminance.

7. The method according to claim 6, wherein the gamma mathematical model is:

$$\frac{Tx - To}{T255 - To} = \left(\frac{Lx}{255}\right)^{Gamma},$$

wherein Tx is the reference output luminance, T255 is a corresponding output luminance when the input gray scale is 255, To is a corresponding output luminance when the input gray scale is 0, Lx is the reference input gray scale, and Gamma is the actual gamma curve value.

8. The method according to claim 2, wherein the n is an integer greater than or equal to 5.

9. The method according to claim 2, wherein before determining the target input gray scale corresponding to the preset target luminance according to the actual gamma curve value, the method further includes:
obtaining an output luminance of a center point of the current image, and taking the output luminance of the center point of the current image as a preset target luminance.

10. The method according to claim 2, wherein before determining the target input gray scale corresponding to the preset target luminance according to the actual gamma curve value, the method further includes:
obtaining output luminance of each pixel in areas other than the uneven area in the current image.

11. The method according to claim 10, wherein after the obtaining the output luminance of each pixel in the areas other than the uneven area in the current image, the method further includes:
taking the average value of the obtained output luminance as a preset target luminance.

12. A gray scale adjustment device for a display panel, comprising a processor, and a memory coupled to the processor and including instructions to cause the processor to perform operations comprising:
performing an image acquisition on the display panel to obtain a current image;
identifying an uneven block in the current image by using a distinguishing method, and detecting an original output luminance and an original input gray scale of the uneven block, wherein the distinguishing method includes (a) identifying a block of the current image in which a sum of gray scale values of all pixels exceeds a target value range or (b) identifying a block of the current image in which a sum of gray scale values of all pixels is lower than a target value range;
determining a target input gray scale corresponding to a preset target luminance according to an actual gamma curve value, wherein the actual gamma curve value is obtained by testing the display panel; and
to taking a difference between the original input gray scale and the target input gray scale as a gray scale compensation value of the uneven block and transmitting the gray scale compensation value to the display panel, wherein the display panel adds the gray scale compensation value to the original input gray scale of the uneven block as a new input gray scale of the uneven block to eliminate the uneven block in the current image.

13. The gray scale adjustment device according to claim 12, wherein before determining the target input gray scale corresponding to the preset target luminance according to the actual gamma curve value, n reference images of the display panel at different input gray levels is obtained, and the n is an integer greater than or equal to 2.

14. The gray scale adjustment device according to claim 13, wherein after obtaining the n reference images of the display panel at different input gray levels, a reference gamma curve value of each reference image is calculated.

15. The gray scale adjustment device according to claim 14, wherein calculating the reference gamma curve value of each reference image specifically includes:
detecting a reference input gray scale and a reference output luminance of each reference image; and
calculating the reference gamma curve value of each reference image according to the reference input gray scale, a reference output luminance, and a gamma mathematical model.

16. The gray scale adjustment device according to claim 15, the gamma mathematical model characterizing a correspondence between the reference input gray scale and the reference output luminance.

17. The gray scale adjustment device according to claim 16, wherein the gamma mathematical model is:

$$\frac{Tx - To}{T255 - To} = \left(\frac{Lx}{255}\right)^{Gamma},$$

wherein Tx is the reference output luminance, T255 is a corresponding output luminance when the input gray scale is 255, To is a corresponding output luminance when the input gray scale is 0, Lx is the reference input gray scale, and Gamma is the actual gamma curve value.

18. The gray scale adjustment device according to claim 13, wherein the n is an integer greater than or equal to 5.

19. A display device, comprising:
a display panel; and
a gray scale adjustment device for a display panel according to claim 12.

* * * * *